Dec. 6, 1966    B. J. BUCHANAN    3,289,917
ELECTRICAL LEAD PULL TAKEOUT
Filed Dec. 28, 1964
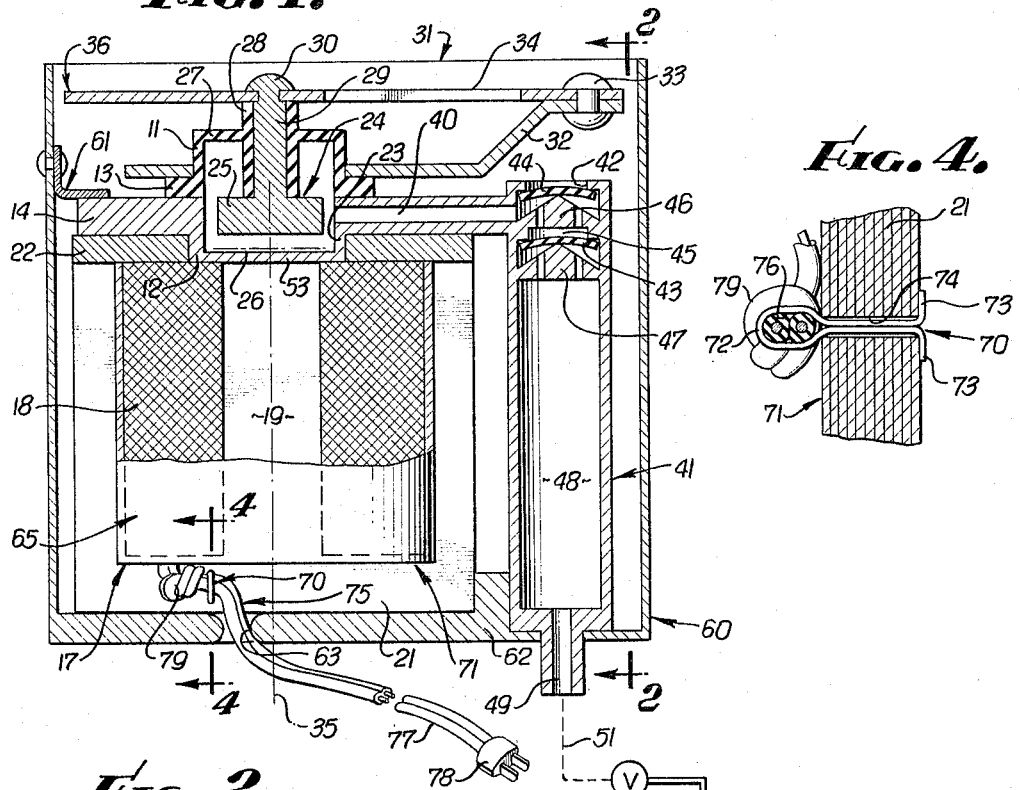
INVENTOR.
BEVERLY J. BUCHANAN
BY
White & Haefliger
ATTORNEYS.

United States Patent Office 3,289,917
Patented Dec. 6, 1966

3,289,917
ELECTRICAL LEAD PULL TAKEOUT
Beverly J. Buchanan, 3915 Bouton Drive,
Lakewood, Calif.
Filed Dec. 28, 1964, Ser. No. 421,490
2 Claims. (Cl. 230—55)

This invention relates generally to electrical equipment utilizing electrical leads which may be subjected to pulling force. More specifically, the invention concerns what may be characterized as electrical lead pull takeout means, particularly as adapted to small electromagnetically operated air pumping devices.

The invention is concerned with a solution to problems having to do with anchoring electrical leads, as for example insulation covered leads, which supply current to electrical equipment. Typically, such leads pass through a housing or partition in extending between the equipment and the current source, such as a wall outlet. Danger arises when the lead is subjected to a sharp pull transmitted back to the electrical equipment, since the insulation covering the lead wire may be torn, and the connection to the electrical equipment may be injured. While certain attempts have been made in the past toward overcoming these problems, to my knowledge no prior effort in this direction offers the unusual and desirable features including attendant simplicity of construction embodied in the present invention.

It is a major object of the invention to provide a load takeout characterized as including blocking means to transfer loading to a support, the blocking means having an aperture to pass an electrical lead, and the lead having a gathered portion such as a knot that is oversized in relation to the aperture so that movement of the gathered portion or knot through the aperture is blocked. Typically, the entirety of the blocking means surface presented toward the knot is smooth, or free of sharp edge construction, so as to prevent damage to the knot. As a result, pulling force exerted on the lead at one side of the knot is transmitted via the knot and the blocking means to a support body and is not transmitted via the lead extent at the opposite side of the knot to electrical equipment to which the lead supplies current.

It is a further object of the invention to provide a combination that includes an electromagnet having a core and a coil, an insulation covered lead connected to the coil, blocking means to transfer loading to the core and forming an aperture, and the lead passing through the aperture and forming a knot that is oversized in relation to the aperture so that movement of the knot through the aperture is blocked. The knot is typically located along the lead between the coil and the blocking means aperture, with the unusual result that the coil is isolated from pulling force exerted on the lead, the latter force being taken out of the lead and instead transmitted to the core when the knot engages the blocking means. This combination may be further combined with fluid pumping mechanism driven with the electromagnet, together with a housing containing the pumping mechanism, electromagnet, knot and blocking means, the housing having a wall with an opening passing a portion of the electrical lead subjected to pulling force. Unusual results flowing from this new and larger combination include the insulation of both coil and housing wall from pull force exerted on the lead, the prevention of damage to the insulation covering on the lead or cord through use of the knot and a smooth surfaced blocking means therefor to take out loading exerted on the lead, and the prevention of such damage as would render the electromagnet and pumping means inoperative.

These and other objects and advantages of the invention, as well as the details of an illustrative embodiment, will be more fully understood from the following detailed description of the drawings, in which:

FIG. 1 is an elevation taken in section through an embodiment of the overall combination that includes an electromagnet and pumping device;

FIG. 2 is an end elevation taken on line 2—2 of FIG. 1;

FIG. 3 is a plan view showing the spring support for the armature; and

FIG. 4 is a section taken on line 4—4 of FIG. 1.

In FIGS. 1 and 2 one form of means for creating pressure pulsations includes a pump chamber generally designated at 10 in which the pulsations are created. Typically, the pump chamber includes first and second coaxial cup-shaped bodies 11 and 12, the former being formed of yieldable material such as rubber or other type elastomer. It has a thickened flange 13 which is held clamped against the flange 14 of the second body 12, the latter typically being formed of a suitable plastic material. Such clamping action may be secured in the manner illustrated, as by a cap 15 fitting downwardly over the body 11 and against the flange 13, and a bracket or bail 16 attached to the cap and extending downwardly along the sides of a power unit at 17, the bail extending therebeneath to clamp the underside thereof as better shown in FIG. 2.

The power unit 17 typically comprises an electromagnet for creating a magnetic field moving generally axially within the chamber 10, and also with respect to the electromagnet coil 18. The coil 18 is ring-shaped, and extends about an inner pole 19 and within an outer E-shaped pole 20, it being understood that the poles 19 and 20 comprise portions of the electromagnet ferrous core which also has a base 21. The core may also be understood as including the ferrous plate 22 or washer which is located at the end face of the outer pole 20 and extends radially inwardly in overlapping relation to the end of the coil 18, this plate element functioning to extend the flux path passing through the poles 19 and 20. The use of this plate thereby strengthens the field produced in the chamber 10 and permits use of heavier wire in the coil 18, the latter permitting manufacture of the coil for less cost than would otherwise be required in the absence of the plate. As is seen in FIG. 1, the plate 22 has an opening 23 receiving the cup-shaped body 12 to extend proximate the end face of the inner pole 19. This feature is important in view of the requirement that the armature actuated by the electromagnet be located proximate the end face thereof.

Such an armature is generally indicated at 24 in FIG. 1 and is supported for reciprocation within the chamber 10 in response to movement therein of the electromagnet field produced by the power unit. The armature illustrated has an enlarged head 25 which travels as close to the inner wall of the body 12 as indicated by the broken lines 26, contact with such inner wall being undesirable from the standpoint of unwanted chatter. Armature movement within the chamber effects the desired pulsation creation therein, and typically the armature is coupled to the chamber to create mechanical pulsing thereof which in turn creates fluid pressure pulsation creation within the chamber interior. One advantageous and unusual way to couple the armature to the chamber 10 for purposes of creating the desired mechanical pulsations thereof is to couple to the flexible wall 27 of the cup-shaped body 11 to cause the latter to reciprocate with the armature toward and away from the cup-shaped body 12. Such coupling may be brought about in the manner illustrated, wherein the body 11 is provided with a tubular portion 28 through which the armature elongated section 29 extends from within the chamber to the exterior thereof and away from the body 12.

The projecting extent of the armature section 29 is suitably fastened as for example by means of the rivet 30 to cantilever spring means generally indicated at 31 in FIGS. 1 and 3 which supports the armature for reciprocation. Such spring means is shown as carried by the cap 15, the latter having an extension 32 which is fastened as by rivet 33 to a first cantilever flat spring 34 extending generally transversely of the axis 35 of the armature, and at the opposite side of the chamber 11 from the power unit 17. The first cantilever spring 34 extends leftward beyond the axis 35 to a location generally indicated at 36 at which the first spring is joined with and carries a second cantilever spring 37. The latter extends back toward the axis 35 and between the bifurcations 38 of the first spring, in order to support the armature as by means of the rivet 30, the head of which is turned over the second flat spring terminal extent. One advantage of so supporting the armature is to derive a generally linear armature movement in spite of the fact that the cantilever springs, considered individually, describe arcs during such reciprocation of the armature. Thus, in FIG. 1 the terminal 36 of the spring 34 will describe an arc which is convex to the left, whereas the rivet head terminal of the spring 37 will describe an arc which is convex to the right. The springs as combined, however, will cause the armature to reciprocate linearly.

Referring back to FIG. 1, the pump chamber 10 is ported to pass fluid pressure pulsations created in the chamber, one form of such porting being shown at 40. Typically, a valve unit 41 which is shown as outside the chamber 10, is in pressure pulsation communication with the chamber through the porting 40. The valve unit illustrated has air inlet and outlet openings 42 and 45 and flexible covers 44 and 43 cooperating with such openings to control in-flow and out-flow of air to and from the valve unit in response to pressure pulsations transmitted to the covers or gates. Thus, upon a pressure reduction transmitted through the porting 40, the cover 44 flexes downwardly as aided and defined by the cover support 46 to admit air into the valve unit 41, and upon transmission of an increased pressure pulse through porting 40, the cover 44 closes the opening 42 and the air drawn into the valve unit is discharged through the opening 45 below the support 46. In this regard the cover 43 during such discharge flexes downwardly to a configuration as determined by the top surface of the support 47 therefor. The supports 46 and 47 are apertured to pass air therethrough. A plenum chamber is shown at 48 within the valve unit 41 to accumulate and dampen pressure pulsations, thereby to provide a steady stream of air discharging at the outlet 49. The latter is shown in communication with a fish tank 50 through a line 51 and a suitable valve 52 therein.

Should the line 51 or valve 52 at any time undesirably restrict the flow of air to the tank, a back-pressure build-up may develop within the valve unit and be communicated to the chamber 10. In this event the flexible wall 27 of the body 11 will deflect upwardly to cause the armature to move relatively away from the power unit 17 thereby to insure against chattering of the armature head 25 against the cup-shaped body 12, and in particular the wall 53 thereof.

The above description is of a device disclosed in that certain application for U.S. Letters Patent Serial No. 223,754, filed on September 14, 1962 by Chester E. Tussey, now Patent No. 3,155,308. That device may be considered as illustrative of electromagnetically operated pumping devices capable of combination with structure now to be described, to form new and improved combinations yielding superior and unusual results, as mentioned in the introduction. Such structure includes blocking means, as for example member 70, to transfer loading to a support such as the base 21 of the electromagnet core 71. Member 70 may take the form of a cotter pin having an eyelet head 72 and a split shank, the ends 73 being bent after insertion through an opening 74 through the lamination of the electromagnet core base 21. Accordingly, holder member 70 is connected to the supporting core.

An insulation covered electrical lead 75 is connected to the coil 18, and it passes through the aperture 76 in the member 70, to extend freely at 77, and ultimately to plug 78. The lead 75 has a gathered portion, as for example a knot 79, that is oversized in relation to the aperture 76, so that bodily movement of the knot through the aperture is blocked by the smooth or rounded surface of the eyelet head 72 of member 70. In this regard, the knot 79 is located along the lead between the coil and aperture 76, and lies alongside the base 21 of the electromagnet core, beneath the coil winding. Also, the entirety of the surface of head 72 presented toward the knot is free of sharp edge construction.

A housing, typically made of molded plastic, is shown at 60 encompassing the electromagnet, pumping device, knot and member 50, the electromagnet being held in fixed position in the housing as by bracket 61 or other structure. The wall 62 of the housing is shown as containing a small opening 63 passing a portion of the lead 75 and being located in such proximity to member 56 that the main face of a pull exerted on the lead exterior of the housing will be transmitted to the knot, but not to the housing nor to the coil 18. Instead, the knot will be pulled against the member 70, which will transmit the pull force to the sturdy metallic core base 21, taking the force out of the lead. Accordingly, damage to the electrical structure, and consequent malfunction of the pumping apparatus, cannot occur as a result of excessive pulling force exertion on the lead or cord 75 outside the housing.

Further protection to the coil structure is afforded by embedding it in a suitably insulative resin such as an epoxide substance indicated at 65.

I claim:

1. In combination, an electromagnet having a core and a coil, an insulation covered electrical lead connected to said coil, a holder attached to the core to transfer loading to the core and forming an aperture, the lead passing through said aperture and forming a knot that is oversized in relation to said aperture so that movement of the knot through said aperture is blocked, pumping mechanism driven by said electromagnet, a housing containing said electromagnet along with said holder and knot, the housing having a thin wall portion containing an opening to pass the lead, said knot being located along the lead between the coil and the aperture, whereby pulling force exerted on the lead to pull said knot against said holder is transmitted thereby to said core and is not transmitted back to the coil.

2. The combination of claim 1, in which the core is clamped in position within the housing, the housing comprises molded plastic material, the core having a base containing an opening through the side thereof, said holder extending in said opening and being anchored to said base to locate the aperture at the side thereof.

References Cited by the Examiner

UNITED STATES PATENTS

| | | | |
|---|---|---|---|
| 2,236,764 | 4/1941 | Peterson | 339—106 X |
| 2,398,002 | 4/1946 | Heyman | 339—106 X |
| 2,743,052 | 4/1956 | Ferrari | 230—55 |

ROBERT M. WALKER, *Primary Examiner.*